Patented Nov. 6, 1951

2,574,447

UNITED STATES PATENT OFFICE 2,574,447

CATALYTIC DESULFURIZATION OF PETROLEUM HYDROCARBONS

Frederick William Bertram Porter, Sunbury-on-Thames, England, assignor to Anglo-Iranian Oil Company Limited, London, England, a British joint-stock corporation No Drawing. Application May 19, 1949, Serial No. 94,262. In Great Britain June 1, 1948

4 Claims. (Cl. 196—28)

1

The invention relates to the catalytic desulphurisation of petroleum hydrocarbons.

It is known to desulphurise petroleum distillates by passing them in admixture with hydrogen over a sulphur resistant hydrogenation catalyst at elevated temperature and elevated pressure whereby organic sulphur compounds present in the distillates are hydrogenated to form hydrogen sulphide which can readily be removed from the treated distillates. The process as normally carried out involves a net consumption of hydrogen and the cost of supplying the hydrogen is a major factor in the economics of the process. Furthermore, in order to secure the necessary partial pressure of hydrogen, it has generally been necessary to operate at elevated pressures ranging from 500–1000 lb./sq. in. or more, and a plant to withstand such pressure has to be made from special steels which are relatively expensive.

The invention has among its objects to provide an improved process for the catalytic desulphurisation of sulphur- and naphthene-containing petroleum distillates boiling above 375° C. Such distillates are used as feedstocks to catalytic cracking units, and also as lubricating oil base stock, and in both connections it is advantageous to desulphurise the distillate. Furthermore, the removal of sulphur is generally accompanied by a considerable shift in boiling range thereby providing a method of producing a low sulphur diesel fuel by a simple topping operation after desulphurisation, as disclosed in the specification of the co-pending application No. 1,752/48.

It is also an object of the invention to provide a process for the catalytic desulphurisation of such heavy petroleum distillates which can be carried out without the use of hydrogen added from an external source.

It is a further object of the invention to enable such a process to be carried out at pressures low enough to avoid the use of special pressure-resisting steels, thereby reducing the cost of the plant.

Yet another object of the invention is to provide a process which is applicable to sulphur- and naphthene-containing petroleum distillates of relatively wide boiling range whereby the individual treatment for the removal of sulphur of a number of fraction of narrow boiling range is rendered unnecessary, with the result that the operations in the refinery necessary to secure high quality products from crude petroleum, are considerably simplified.

It has now been found that by careful control

2 of the reaction conditions and that by selecting a suitable catalyst, it is possible to effect desulphurisation of petroleum distillates boiling above 375° C., without adding hydrogen from an external source, the hydrogen necessary for the conversion of the sulphur in the feedstock into hydrogen sulphide being derived from the feedstock itself. It has also been found that by careful control of the reaction conditions it is possible to secure a very long catalyst life with the necessity for only occasional regenerations, while maintaining a high degree of desulphurisation.

According to the invention, the desulphurisation of a sulphur- and naphthene-containing petroleum distillate boiling above 375° C. is effected by passing the distillate in vapour form over a catalyst which combines activity for the dehydrogenation of naphthene molecules to aromatics with activity for the conversion of organically combined sulphur into hydrogen sulphide, and which is not poisoned as a catalyst by the presence of sulphur compounds, at a temperature and at a pressure sufficient to effect the conversion of a considerable proportion of the sulphur contained in the feedstock into hydrogen sulphide, and to produce a hydrogen-rich gas mixture which is recycled to the reaction zone at a rate sufficient to maintain the necessary partial pressure of hydrogen therein.

It is believed that the reaction proceeds by dehydrogenation of some of the naphthenes to produce more than sufficient hydrogen to convert the combined sulphur present into hydrogen sulphide, and the reaction conditions for any particular feedstock must therefore be determined having regard to any limiting process conditions imposed by these two reactions. The pressure must exceed a certain minimum in order to secure a sufficient degree of desulphurisation, but it has been found that by using active catalysts of the type consisting of cobalt molybdate supported on alumina, it is possible to operate successfully at pressures as low as 50 lb./sq. in., and in general pressures within the range 100–200 lb./sq. in. are satisfactory. High pressures tend to reverse the dehydrogenation reaction in that aromatics are hydrogenated to naphthenes.

Increase of pressure will therefore give rise to a proportional increase in desulphurisation only within those limits which provide a sufficient balance of hydrogen for the desulphurisation reaction, while if too low a pressure is employed, coking sets in.

The temperature must also be confined within narrow limits since the dehydrogenation reaction will not proceed below a minimum temperature which has been found to be about 750° F., with the result that insufficient hydrogen is produced to convert the sulphur into hydrogen sulphide and to provide the hydrogen-rich gas for recycling to the reaction zone. Again, the temperature must not be allowed to exceed a maximum which has been found to be in the region of 800° F., since above that temperature the cracking reaction sets in with the above mentioned disadvantageous effects on the desulphurisation reaction.

The space velocity may be varied according to the degree of desulphurisation required but in general should lie between 0.5 and 2.0 v./v./hr.

The hydrogen-containing gas mixture must be recycled to the reaction zone at a rate sufficient to maintain the necessary partial pressure of hydrogen therein. Thus, the gas recycle rate should not generally fall below 2000 cu. ft./bbl. of feedstock, while recycle rates above 4000 cu. ft./bbl. are uneconomic.

The separation of the gaseous fraction from the treated distillate may advantageously be effected by cooling the distillate at the reaction pressure, when it has been found that the content of hydrogen sulphide in the separated gas builds up to an equilibrium constant, after which the gases may be recycled to the reaction zone without further increase in the content of hydrogen sulphide, the hydrogen sulphide being thereafter dissolved in the product until such time as it is depressurised. If desired, however, the hydrogen sulphide may be removed from the gas recycled to the reaction zone by any of the usual methods. If desired, also, the gases may be submitted to the treatment to increase the relative proportion of hydrogen therein, as for example by passage through an oil tower.

Among the catalysts that may be used are metal sulphides and oxides especially those of the 6th group, either alone (for example chromium oxide and tungsten sulphide) or in admixture with other sulphides or oxides (for example, pellets consisting of two parts tungsten sulphide and one part nickel sulphide) or in combination with other oxides or sulphides (for example, cobalt molybdate or thiomolybdate) or mixed with, or deposited on, a porous support such as natural or processed bauxite, activated alumina and kieselguhr. Natural and processed bauxite may themselves be used as catalysts. The preferred catalyst consists of cobalt molybdate supported on alumina.

An effective pelleted catalyst was prepared by mixing powdered cobalt oxide, bolybdic oxide and alumina, and pelleting with 1% graphite into $\frac{3}{16}''$ pellets which were then treated for two hours at 550° C. The catalyst may also be prepared by extrusion.

An effective cobalt molybdate type catalyst was prepared by the impregnation of roasted Indian bauxite with cobalt molybdate solution, so that the molybdenum content of the material stable at 1000° F. was 3.6% by weight, while the cobalt content of the material stable at 1000° F. was 1.0% weight.

The distillate may be treated alone, but in some cases the content of naphthenes in the feedstock may be insufficient to provide sufficient hydrogen to effect an appreciable sulphur removal. According to a modification of the invention therefore, the desulphurisation of a petroleum distillate boiling above 375° C. is effected by passing the distillate in vapour form in admixture with a naphthene-containing, lower-boiling petroleum fraction over a catalyst for the dehydrogenation of naphthenes and the hydrogenation of organic sulphur compounds at a temperature and at a pressure sufficient to effect the conversion of a considerable proportion of the sulphur contained in the feedstock into hydrogen sulphide and to provide a hydrogen-rich gas mixture which is recycled to the reaction zone at a rate sufficient to maintain the necessary partial pressure of hydrogen therein.

The petroleum distillate boiling above 375° C. may advantageously be admixed with a kerosine and/or a gas oil fraction derived from petroleum, and such mixture may be produced as a single fraction from crude petroleum.

The following is an example of the process of the invention:

*Example*

An Iranian wax distillate having the properties set out below was heated to 800° F. and was passed into a reactor containing a catalyst consisting of cobalt molybdate supported on alumina at a space velocity of 0.5 v./v./hr., a temperature of 800° F. and a pressure of 100 lb./sq. in. The products from the reaction zone were cooled, and the gases separated were recycled with the feedstock to the heating zone at a rate of approximately 4000 cu. ft. per barrel of feedstock. The hydrogen sulphide was allowed to build up to an equilibrium in the recycled gases, and the sulphur removed from the feedstock was dissolved in the product as $H_2S$, from which it was stripped by conventional methods.

The nett gas make amounted to 10–15 cu. ft. per barrel, of which 80% was hydrogen.

The process was carried on for over 100 hours when it was necessary to regenerate the catalyst. Regeneration was carried out in the conventional manner and no loss of activity resulted from repeated regenerations.

| Inspection Data | Feedstock | Product |
|---|---|---|
| S. G. @ 140° F | 0.8785 | 0.856 |
| Wt. percent <400° C | 5.0 | 20.0 |
| Wt. per cent >400° C | 95.0 | 80.0 |
| Sulphur Content, wt. percent | 1.5 | 0.3 |
| Sulphur Removal, per cent | | 80.0 |

I claim:

1. In a continuous process for the hydrocatalytic desulphurization of a sulphur-and-naphthene-containing petroleum distillate boiling above 375° C. wherein the distillate is contacted in vapor form in a reaction zone at an elevated temperature and pressure in the presence of hydrogen with a dehydrogenation-hydrogenation catalyst which is immune to sulphur poisoning and combines activity for the dehydrogenation of naphthenes in said distillate to aromatics with activity for the hydrogenation of organically combined sulphur in the distillate to hydrogen sulphide, the method of operating the process so that it will be self-supporting with respect to the hydrogen needed and produce, as product, a desulphurized distillate whose nature, except for lowered sulphur content, is substantially the same as the feedstock, which method comprises the steps of: passing the distillate to be treated through said reaction zone in vapour form and contacting the distillate therein with said catalyst and with hydrogen derived solely from the distillate:

maintaining a selected temperature in said zone between about 750° F. to about 800° F. at which hydrogen is continuously produced from said distillate by dehydrogenation of naphthenes therein to aromatics; maintaining a selected pressure in said zone between about 50 to about 200 lbs./sq. in. gauge, said selected temperature and pressure being correlated to provide a continuous net production of hydrogen at least equal to but not substantially in excess of that required to effect conversion of said organic sulphur compounds to hydrogen sulphide and to maintain the pressure in said zone; separating a hydrogen-rich gas mixture from the treated distillate; recycling said hydrogen-rich gas mixture to said reaction zone to constitute the whole of the hydrogen supplied to said zone, the hydrogen-rich gas mixture recycle rate being sufficient to maintain the necessary partial pressure of hydrogen in said zone; and, recovering the desired product distillate from the residue of said separating operation.

2. A process in accordance with claim 1 wherein the space velocity of the distillate in said reaction zone is between 0.5 and 2.0 v./v./hr., and wherein the hydrogen-rich gas mixture is recycled to the reaction zone at a rate in the range of from about 2000 to about 4000 cu. ft./bbl. of feedstock.

3. A process in accordance with claim 1 in which said catalyst is cobalt molybdate.

4. A process in accordance with claim 1 wherein the distillate consists chiefly of material boiling substantially within the wax distillate range, wherein the space velocity of the distillate in said reaction zone is approximately 0.5 v./v./hr., wherein the selected temperature is approximately 800° F. and the selected pressure is approximately 100 lbs./sq. in. gauge, wherein the hydrogen-rich gas mixture is recycled to the reaction zone at a rate of approximately 4000 cu. ft./bbl. of distillate feedstock, and wherein the catalyst consists of cobalt molybdate supported on alumina.

FREDERICK WILLIAM
BERTRAM PORTER.

REFERENCES CITED

The following references are of record in the file of this patent:

UNITED STATES PATENTS

| Number | Name | Date |
|---|---|---|
| 2,380,279 | Welty | July 10, 1945 |
| 2,380,853 | Linn et al. | July 31, 1945 |
| 2,393,288 | Byrns | Jan. 22, 1946 |
| 2,423,176 | Cole | July 1, 1947 |

FOREIGN PATENTS

| Number | Country | Date |
|---|---|---|
| 594,569 | Great Britain | Nov. 13, 1947 |